United States Patent [19]

Grabowski et al.

[11] Patent Number: 4,824,809

[45] Date of Patent: Apr. 25, 1989

[54] OPTICAL CDO AND THO$_2$-FREE GLASS WITH REFRACTIVE INDICES OF 1.73–1.78 ABBE NUMBERS OF 30–34, AND HIGH DEVITRIFICATION STABILITY

[75] Inventors: Danuta Grabowski, Taunusstein; Ludwig Ross, Klein Winterheim, both of Fed. Rep. of Germany

[73] Assignee: Schott Glaswerke, Mainz, Fed. Rep. of Germany

[21] Appl. No.: 139,069

[22] Filed: Dec. 28, 1987

Related U.S. Application Data

[63] Continuation of Ser. No. 818,858, Jan. 15, 1986, abandoned.

[30] Foreign Application Priority Data

Jan. 15, 1985 [DE] Fed. Rep. of Germany ....... 3501100

[51] Int. Cl.$^4$ .................. C03C 3/072; C03C 3/074; C03C 4/00
[52] U.S. Cl. ........................ 501/75; 501/76; 501/903
[58] Field of Search ............. 501/75, 76, 903

[56] References Cited

U.S. PATENT DOCUMENTS

| | | | |
|---|---|---|---|
| 3,477,863 | 11/1969 | Bromer et al. ............ | 106/54 |
| 3,653,933 | 4/1972 | Tsunekawa ............... | 501/903 |
| 3,888,692 | 6/1975 | Kuwayama .............. | 501/903 |
| 3,958,999 | 5/1976 | Izamitani et al. ......... | 501/903 |
| 4,568,651 | 2/1986 | Sagara ..................... | 501/903 |

FOREIGN PATENT DOCUMENTS

| | | |
|---|---|---|
| 7391118 | 11/1973 | Japan . |
| 48-91118 | 11/1973 | Japan . |
| 50-73914 | 6/1975 | Japan . |
| 53-28448 | 8/1978 | Japan . |
| 1010475 | 11/1965 | United Kingdom . |

OTHER PUBLICATIONS

Chemical Abstracts 80:148482f (1974).

*Primary Examiner*—Mark L. Bell
*Attorney, Agent, or Firm*—Millen & White

[57] ABSTRACT

A new, CdO-and ThO$_2$-free optical glass with refractive indices of 1.73–1.78 and Abbe numbers of 30–34 and with particularly good devitrification stability comprises (in weight %):

| | | | | | | | |
|---|---|---|---|---|---|---|---|
| SiO$_2$ | 12–20, | B$_2$O$_3$ | 10–18, | PbO | 50–60 |
| Al$_2$O$_3$ | 2–7, | ZnO | 0–4, | ZrO$_2$ | 0.5–3 |
| La$_2$O$_3$ | 2–10, | Cs$_2$O | 0–5, | M$_2$O | 0–1 |

(M$_2$O = Na$_2$O, K$_2$O, Li$_2$O) TiO$_2$ 0–5
with the SiO$_2$/B$_2$O$_3$-ratio being about 1.0 to 1.5.

15 Claims, No Drawings

OPTICAL CDO AND THO₂-FREE GLASS WITH REFRACTIVE INDICES OF 1.73–1.78 ABBE NUMBERS OF 30–34, AND HIGH DEVITRIFICATION STABILITY

This application is a continuation of application Ser. No. 818,858, filed Jan. 15, 1986, now abandoned.

BACKGROUND OF THE INVENTION

This invention relates to a new optical glass having good devitrification stability, good transmission, a good optical quality, refractive indices of 1.73–1.78 and Abbe numbers of 30–34.

Glasses with a similar optical position have already been described in several publications. German AS No. 12 607 12 describes glasses with $n_d \leq 1.86$ and $v_d > 26$, which are mainly within the system $SiO_2$-$B_2O_3$-$BaO$-$ZnO$. The optical position and the good chemical stability of these glasses can only be achieved by addition of up to 25% $TiO_2$ and of up to 7% $ZrO_2$. This entails a deterioration of transmission in the short-wave length spectral range (around 400 nm) as well as of devitrification stability.

The PbO-ZnO glasses known from JP-OS No. 78037886 require, for crystallization-stabilization and improved chemical resistance, up to 12 wt % $Al_2O_3$, which in turn detracts from the meltability of these glasses.

The glasses produced within the system $SiO_2$-$BaO$-$La_2O_3$-$PbO$, which are known from Japanese Pat. Nos. 75 73914 and 77 84211, require up to 25% $Ta_2O_5$+$ZrO_2$ or up to 15% $TiO_2$ and up to 20% $Nb_2O_5$ in order to achieve the desired optical position, crystallization stablity and chemical stability. With these glasses, high costs in the first case and transmission losses as well as stronger devitrification in the second case must be expected.

SUMMARY OF THE INVENTION

It is thus an object of this invention to provide a glass composition range which enables the production of high-reflective index optical glasses with good devitrification stability, good transmission and good optical quality without the environmentally hostile components CdO and ThO₂.

Upon further study of the specification and appended claims, further objects and advantages of this invention will become apparent to those skilled in the art.

These objects have been achieved by providing optical, substantially CdO-and ThO₂-free glass with refractive indices of 1.73–1.78, Abbe numbers of 30–34, particularly good devitrification stability, good transmission in the visible range and low raw material costs, having the following composition (in weight per cent):

| | | |
|---|---|---|
| SiO₂ | 12–20 | |
| B₂O₃ | 10–18 | |
| PbO | 50–60 | |
| Al₂O₃ | 2–7 | |
| ZnO | 0–4 | |
| ZrO₂ | 0.5–3 | |
| La₂O₃ | 2–10 | |
| Cs₂O | 0–5 | |
| M₂O | 0–1 | (M₂O = Na₂O, K₂O, Li₂O) |
| TiO₂ | 0–5 | |

Preferred compositions are in wt. %:

| | |
|---|---|
| SiO₂ | 15–18 |
| B₂O₃ | 13–15 |
| PbO | 52–60 |
| Al₂O₃ | 4.5–6 |
| ZnO | 1.5–3 |
| ZrO₂ | 1.5–3 |
| La₂O₃ | 2–10 |
| Cs₂O | 0–2 |

Also preferred are glasses wherein the ratio SiO₂/B₂O₃ is about 1.0 to 1.5.

The glass can also include other ingredients, e.g., in wt. %:

| | |
|---|---|
| SnO₂ | 0–1.5 |
| F⁻ (replacing O=) | 0–2 |
| Y₂O₃ | 0–2 |
| Bi₂O₃ | 0–2 |
| Gd₂O₃ | 0–2 |
| MO (MgO, CaO, SiO, BaO) | 0–10 |
| Ta₂O₅ | 0–2 |
| Nb₂O₅ | 0–1 |

DETAILED DISCUSSION

In the glasses according to this inventon, the high refractive indices are achieved primarily by the use of PbO and La₂O₃, and partly by means of ZrO₂. Good crystallization stability in turn is achieved by balanced amounts of SiO₂ and B₂O₃ (especially preferred ratio SiO₂:B₂O₃=1.14 to 1.24), ZnO (optionally), Al₂O₃ and small optional additions of Cs₂O, SnO₂, Y₂O₃, Gd₂O₃ and/or Bi₂O₃.

The glasses according to this invention satisfy not only the demand for good transmission, low light scattering and good optical quality, but also for excellent crystallization stability and very low production costs. These thus are very useful to form optical elements.

When one of the optional elements is used in the glass, it typically is used in amounts of at least 0.1, 0.3, 0.5, 0.7, 1.0, 1.3, 1.5 etc. depending on its generic range above.

The glasses according to the invention can be produced as follows. The raw materials (e.g. oxides, carbonates, nitrates, fluorides) are weighed out; a conventional refining agent such as As₂O₃ in amounts of 0.1 to 0.5 wt % is added and subsequently the whole is well mixed. The batch is melted down at about 1140° to 1180° C. in a ceramic or platinum crucible, refined at 1240° C.–1280° C. and well homogenized by means of an agitator. With a casting temperature of about 1050° C. and a viscosity of approximately 10 dPas, the glass is then poured into metal dies.

Sample melt for 100 kg calculated glass

| Oxide | weight % | raw material | weight quantity (kg) |
|---|---|---|---|
| SiO₂ | 16.40 | quartz powder | 16.42 |
| B₂O₃ | 14.00 | H₃BO₃ | 24.87 |
| PbO | 56.13 | Pb₃O₄ | 57.47 |
| ZnO | 1.90 | ZnO | 1.91 |
| Al₂O₃ | 5.30 | AlO(OH) | 6.68 |
| La₂O₃ | 4.57 | La₂O₃ | 4.57 |
| ZrO₂ | 1.70 | ZrO₂ | 1.70 |
| | | +As₂O₃ | 113.62 |
| | | | 0.10 (ref. agent) |

| Oxide | weight % | raw material | weight quantity (kg) |
|---|---|---|---|
| | | | 113.72 kg batch |

The properties of this glass are specified in Table 1, example 1.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the preceding text and the following examples, all temperatures are set forth uncorrected in degrees Celsius and all parts and percentages are by weight, unless otherwise indicated.

TABLE 1

| | 1 | 2 | 3 | 4 | 5 | 6 | 7 | 8 | 9 | 10 | 11 |
|---|---|---|---|---|---|---|---|---|---|---|---|
| $SiO_2$ | 16.40 | 15.50 | 15.20 | 15.00 | 17.50 | 16.50 | 16.50 | 16.50 | 16.50 | 16.15 | 16.50 |
| $B_2O_3$ | 14.00 | 13.40 | 13.30 | 13.00 | 15.00 | 13.30 | 14.00 | 13.30 | 14.00 | 13.50 | 14.00 |
| PbO | 56.13 | 59.75 | 53.40 | 60.00 | 52.20 | 56.50 | 56.50 | 55.70 | 56.50 | 56.50 | 56.50 |
| ZnO | 1.90 | 1.70 | 1.50 | 1.50 | 2.50 | 1.70 | 1.70 | 1.70 | 1.70 | 1.70 | 1.70 |
| $Al_2O_3$ | 5.30 | 5.30 | 5.30 | 4.95 | 5.50 | 5.20 | 5.20 | 5.20 | 5.20 | 5.20 | 5.30 |
| $La_2O_3$ | 4.57 | 2.50 | 9.50 | 3.45 | 6.50 | 4.30 | 3.00 | 4.30 | 3.50 | 4.30 | 4.30 |
| $ZrO_2$ | 1.70 | 1.75 | 1.70 | 2.00 | 0.70 | 1.60 | 1.60 | 1.60 | 1.60 | 1.60 | 1.60 |
| $Cs_2O$ | | | | | | 0.70 | | | | | |
| $Y_2O_3$ | | | | | | | 1.30 | | | | |
| $Bi_2O_3$ | | | | | | | | 1.50 | | | |
| $Gd_2O_3$ | | | | | | | | | 0.80 | | |
| $SnO_2$ | | | | | | | | | | 0.85 | |
| $F^-$ | | | | | | | | | | | 0.30 |
| $As_2O_3$ | 0.10 | 0.10 | 0.10 | 0.10 | 0.10 | 0.20 | 0.20 | 0.20 | 0.20 | 0.20 | 0.20 |
| $\frac{SiO_2}{B_2O_3}$ | 1.17 | 1.16 | 1.14 | 1.15 | 1.17 | 1.24 | 1.18 | 1.24 | 1.18 | 1.20 | 1.18 |
| $n_d$ | 1.7575 | 1.7675 | 1.7698 | 1.7793 | 1.7342 | 1.7530 | 1.7515 | 1.7590 | 1.7524 | 1.7577 | 1.7507 |
| $v_d$ | 31.86 | 30.6 | 31.80 | 30.00 | 33.50 | 31.60 | 31.90 | 31.50 | 31.8 | 31.5 | 32.0 |
| Ti* 400/25 | 0.74 | 0.73 | 0.75 | 0.73 | 0.75 | 0.79 | 0.76 | 0.73 | 0.78 | 0.74 | 0.78 |

*Ti 400 nm/25 mm; net transmission at wavelength 400 nm and layer thickness of 25 mm.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

Example 1 is a typical example of a glass according to the invention. This glass is used as an optical glass and replaces the well-known optical glass LaF11 which is widely used in optical lens systems, and which contains CdO and $ThO_2$.

What is claimed:

1. An optical, substantially CdO-and $ThO_2$-free glass having a refractive index of 1.73–1.78, an Abbe number of 30–34, good devitrification stability, good transmission in the visible range and low raw material cost, consisting essentially of in weight percent:

| $SiO_2$ | 12–20 |
|---|---|
| $B_2O_3$ | 10–18 |
| PbO | 52–60 |
| $Al_2O_3$ | 2–7 |
| ZnO | 0–3 |
| $ZrO_2$ | 0.5–3 |
| $La_2O_3$ | 2–9.5 |
| $Cs_2O$ | 0–5 |
| $M_2O(M_2O=Na_2O, K_2O, Li_2O)$ | 0–1 |
| $TiO_2$ | 0–5, |
| $SnO_2$ | 0–1.5 |
| $F^-$ (replacing $O^=$) | 0–2 |
| $Y_2O_3$ | 0–2 |
| $Bi_2O_3$ | 0–2 |
| $Nb_2O_5$ | 0–1. |

2. A glass of claim 1 wherein the ratio of $SiO_2/B_2O_3$ is in the range of 1.0 to 1.5.

3. A glass of claim 1, consisting essentialy of (in wt. %):

| $SiO_2$ | 15–18 |
|---|---|
| $B_2O_3$ | 13–15 |
| PbO | 52–60 |
| $Al_2O_3$ | 4.5–6 |
| ZnO | 1.5–3 |
| $ZrO_2$ | 1.5–3 |
| $La_2O_3$ | 2–10 |
| $Cs_2O$ | 0–2. |

4. A glass of claim 3 wherein the ratio of $SiO_2/B_2O_3$ is in the range of 1.0 to 1.5.

5. A glass of claim 1 wherein the ratio of $SiO_2/B_2O_3$ is in the range of about 1.14 to 1.24.

6. A glass of claim 3 wherein the ratio of $SiO_2/B_2O_3$ is in the range of 1.14 to 1.24.

7. A glass of claim 1 containing $SnO_2$.

8. A glass of claim 1 containing $F^-$.

9. A glass of claim 1 containing $Y_2O_3$.

10. A glass of claim 1 containing $Bi_2O_3$.

11. A glass of claim 1 containing $Cs_2O$.

12. A glass of claim 1 containing $Nb_2O_5$.

13. An optical element consisting essentially of a glass of claim 1.

14. A glass of claim 1 having a ZnO content of 0–2.5% in weight.

15. A glass of claim 1 having a ZnO content of 0–1.7% in weight.

* * * * *